United States Patent
Iacovone et al.

(10) Patent No.: US 11,524,614 B2
(45) Date of Patent: Dec. 13, 2022

(54) INSERT FOR INTEGRATION INTO TRIM LAYER AND PROVIDING CONDITIONING

(71) Applicant: GENTHERM GMBH, Odelzhausen (DE)

(72) Inventors: Peter Daniel Iacovone, Amherstburg (CA); Zoran Panic, Windsor (CA); Ricardo Edmundo Flores Gonzalez, Novi, MI (US); Madalina Onica, Northville, MI (US)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 17/377,605

(22) Filed: Jul. 16, 2021

(65) Prior Publication Data

US 2021/0339662 A1 Nov. 4, 2021

Related U.S. Application Data

(63) Continuation of application No. 16/636,731, filed as application No. PCT/IB2018/001116 on Sep. 5, 2018, now Pat. No. 11,065,991.

(60) Provisional application No. 62/554,515, filed on Sep. 5, 2017.

(51) Int. Cl.
  *A47C 7/72* (2006.01)
  *B60N 2/56* (2006.01)
  *B60N 2/58* (2006.01)

(52) U.S. Cl.
  CPC ......... *B60N 2/5657* (2013.01); *B60N 2/5642* (2013.01); *B60N 2/58* (2013.01); *B60N 2/5685* (2013.01); *H05B 2203/029* (2013.01)

(58) Field of Classification Search
  CPC .. B60N 2/5657; B60N 2/5635; B60N 2/5642; B60N 2/5685; B60N 2/565; B60N 2/58; B60N 2/5621; B60N 2/68; B60N 2/70; B60N 2/5628
  See application file for complete search history.

(56) References Cited

U.S. PATENT DOCUMENTS

| | | |
|---|---|---|
| 5,176,424 A | 1/1993 | Tobita |
| 6,003,950 A | 12/1999 | Larson |
| 6,068,332 A | 5/2000 | Faust et al. |
| 6,626,488 B2 | 9/2003 | Pfahler |
| 6,808,230 B2 | 10/2004 | Buss et al. |
| 6,869,140 B2 | 3/2005 | White et al. |
| 6,893,086 B2 | 5/2005 | Bajic et al. |
| 7,040,710 B2 | 5/2006 | White et al. |
| 7,052,091 B2 | 5/2006 | Bajic et al. |
| 7,197,801 B2 | 4/2007 | Bajic et al. |
| 7,452,028 B2 | 11/2008 | Knoll et al. |
| 7,478,869 B2 | 1/2009 | Lazanja et al. |

(Continued)

FOREIGN PATENT DOCUMENTS

| | | |
|---|---|---|
| DE | 102006048048 A1 | 4/2008 |
| WO | 2014/058429 A1 | 4/2014 |

OTHER PUBLICATIONS

International Search Report and Written Opinion for International Application PCT/IB2018/001116, dated Feb. 4, 2019.

*Primary Examiner* — Shin H Kim
(74) *Attorney, Agent, or Firm* — The Dobrusin Law Firm, P.C.

(57) ABSTRACT

An insert comprising: (a) a cover layer; (b) a spacer layer located below the cover layer; (c) a connection material that is adapted to extend between and connect the cover layer to a trim layer so that the insert is fixed to the trim layer.

20 Claims, 7 Drawing Sheets

(56) References Cited

U.S. PATENT DOCUMENTS

| | | |
|---|---|---|
| 7,588,288 B2 | 9/2009 | Bajic et al. |
| 8,191,187 B2 | 6/2012 | Brykalski et al. |
| 8,360,517 B2 | 1/2013 | Lazanja et al. |
| 9,440,567 B2 | 9/2016 | Lazanja et al. |
| 9,738,191 B2 | 8/2017 | Lanfensiepen et al. |
| 9,751,440 B2 | 9/2017 | Dry et al. |
| 10,051,973 B2 | 8/2018 | Morgan et al. |
| 10,118,518 B2 | 11/2018 | Dry et al. |
| 10,118,520 B2 | 11/2018 | Craig et al. |
| 10,821,862 B2 | 11/2020 | Russman et al. |
| 2002/0003363 A1 | 1/2002 | Buss et al. |
| 2002/0096931 A1 | 7/2002 | White et al. |
| 2003/0214160 A1 | 11/2003 | Brennan et al. |
| 2004/0036326 A1 | 2/2004 | Bajic et al. |
| 2004/0104607 A1 | 6/2004 | Minegishi et al. |
| 2005/0121965 A1 | 6/2005 | Stowe |
| 2005/0127723 A1 | 6/2005 | Bajic et al. |
| 2005/0140189 A1 | 6/2005 | Bajic et al. |
| 2007/0158981 A1 | 7/2007 | Almasi et al. |
| 2007/0176471 A1 | 8/2007 | Knoll |
| 2007/0188007 A1 | 8/2007 | Lazanja et al. |
| 2009/0033130 A1 | 2/2009 | Marquette et al. |
| 2009/0152909 A1 | 6/2009 | Anderson |
| 2009/0253363 A1 | 10/2009 | Pudenz |
| 2013/0097777 A1 | 4/2013 | Marquette et al. |
| 2014/0077517 A1 | 3/2014 | Gutierrez et al. |
| 2015/0274049 A1 | 10/2015 | Langensiepen et al. |
| 2015/0329027 A1 | 11/2015 | Axakov |
| 2017/0136926 A1 | 5/2017 | Dry et al. |
| 2018/0187348 A1 | 7/2018 | Mueller et al. |
| 2018/0361893 A1 | 12/2018 | Iacovone et al. |
| 2020/0180479 A1 | 6/2020 | Russman et al. |
| 2020/0247287 A1 | 8/2020 | Iacovone et al. |

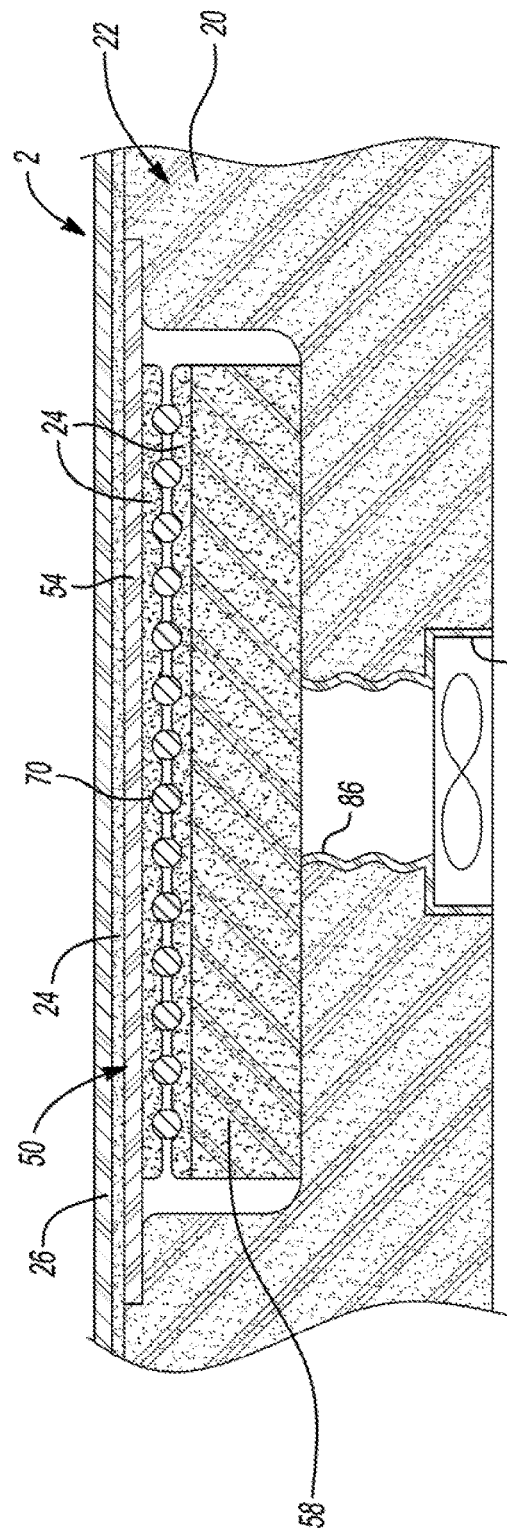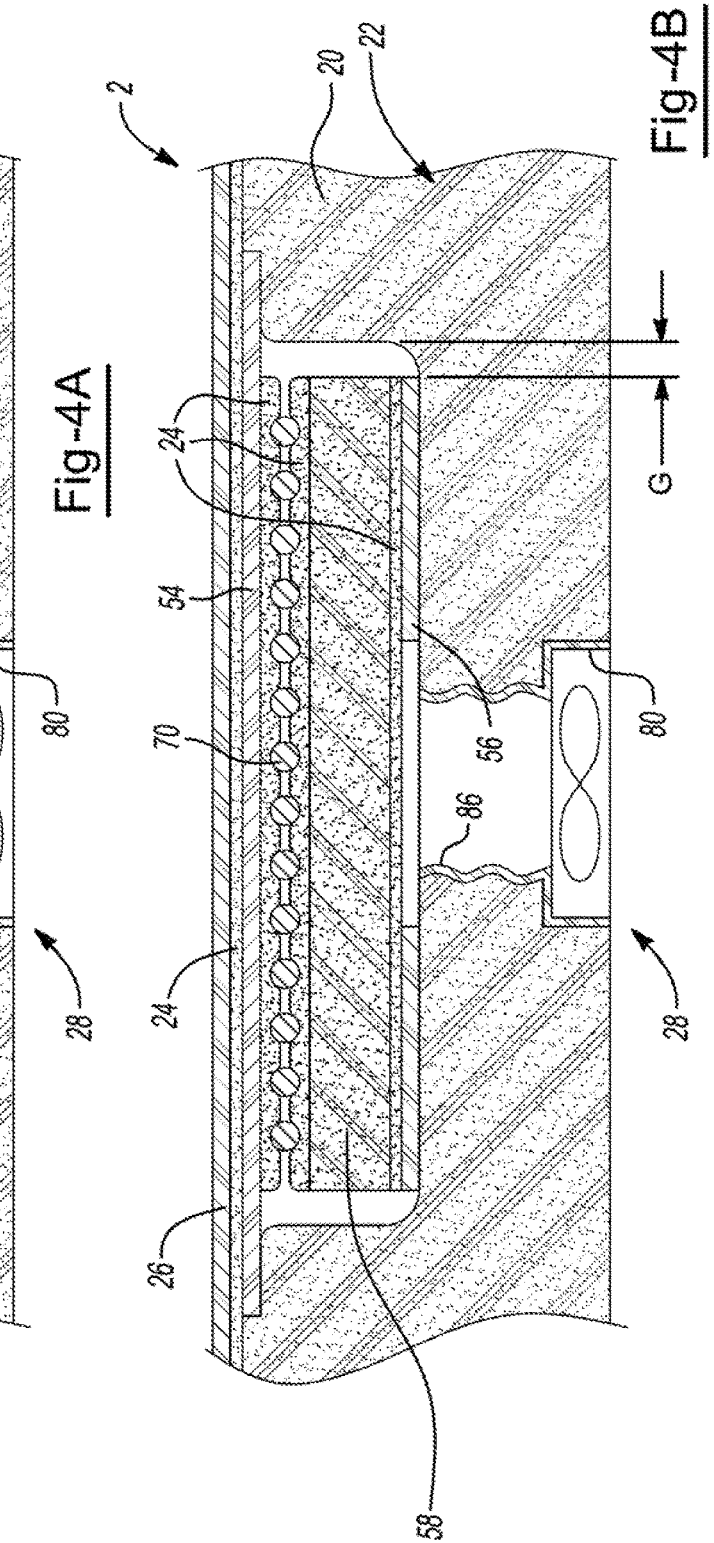

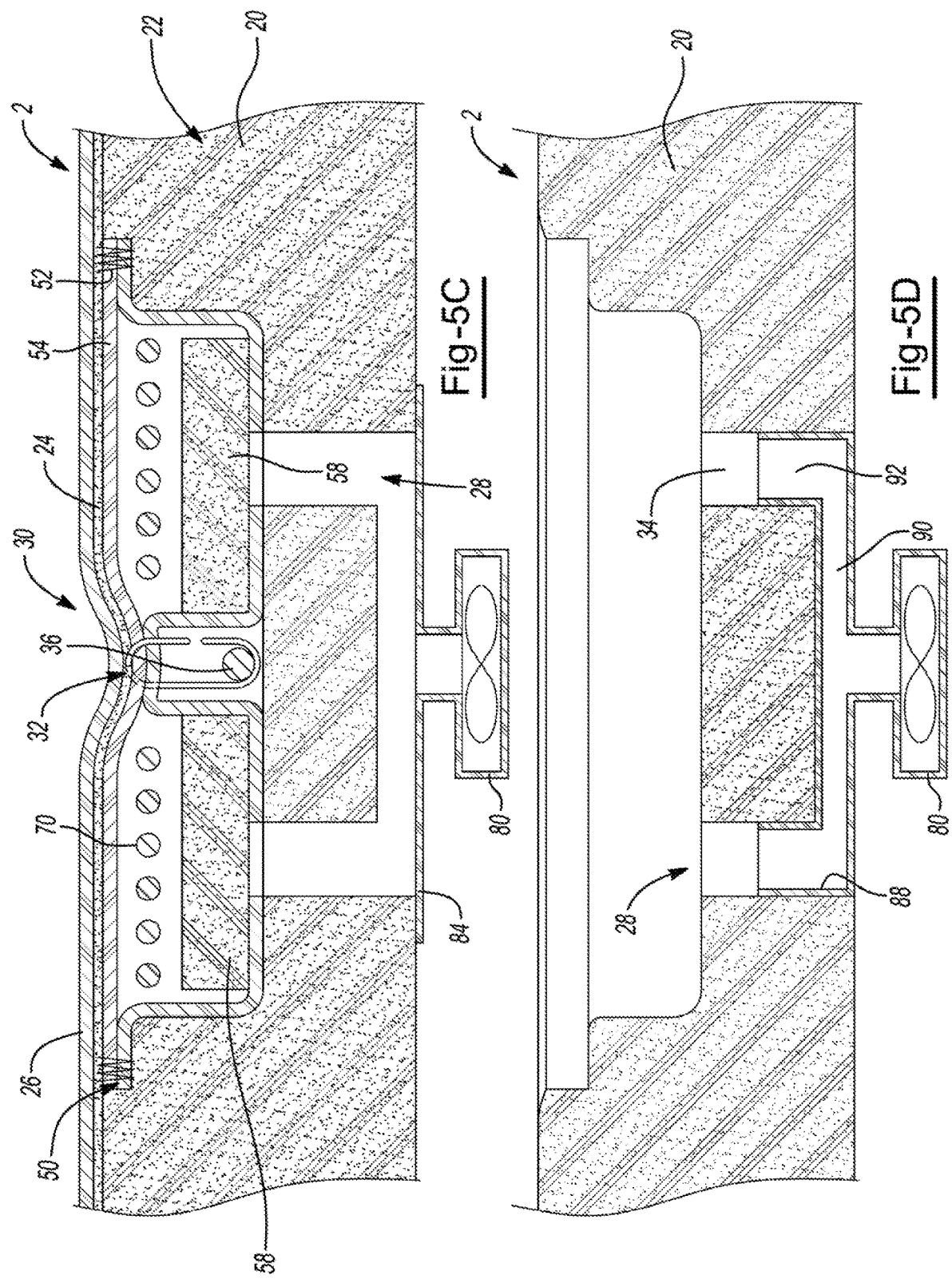

INSERT FOR INTEGRATION INTO TRIM LAYER AND PROVIDING CONDITIONING

FIELD

The present teachings relate generally an insert that provides climate control, and more specifically an insert that is integrated into a trim layer so that one or more blowers provide conditioning to a vehicle seat.

BACKGROUND

For many years, industry has been concerned with designing improved conditioning systems for articles of manufacture such as seats, steering wheels, automotive vehicles, or other transportation vehicles. Examples of such conditioning systems are disclosed in U.S. Pat. Nos. 5,176,424; 6,626,488; 6,869,140; 7,452,028; and 7,478,869; and U.S. Patent Application Publication Nos. 2015/0329027 and 2017/0136926 all of which are expressly incorporated herein by reference for all purposes. Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower. The conditioner is placed on the seat and may be held in place by a recess in the seat or the trim layer being attached over the conditioner and the seat.

What is needed is an insert that is configured to be integrated into the trim layer of a vehicle seat. What is needed is an insert and trim layer that are applied simultaneously. It would be desirable to have an insert that is connected to the trim layer so that fastening of the trim layer fastens the insert on the vehicle seat. What is needed is an insert that connects to the trim layer and has a profile that cannot be felt by an occupant of the vehicle seat. It would be desirable to have an insert that is self-contained and internally includes a heater, a spacer layer, or both.

SUMMARY

The present teachings include: a conditioning system comprising: (a) a blower; (b) an insert in communication with the blower, the insert including: (i) a cover layer, (ii) a heater located under the cover layer, and (iii) a spacer located under the heater; wherein the insert is integrally connected to a trim layer of a vehicle seat so that the trim layer and the insert form a unitary piece.

The present teachings provide an insert that is configured to be integrated into the trim layer of a vehicle seat. The present teachings provide an insert and trim layer that are applied simultaneously. The present teachings provide an insert that is connected to the trim layer so that fastening of the trim layer fastens the insert on the vehicle seat. The present teachings provide an insert that connects to the trim layer and has a profile that cannot be felt by an occupant of the vehicle seat. The present teachings provide an insert that is self-contained and internally includes a heater, a spacer layer, or both.

BRIEF DESCRIPTION OF THE DRAWINGS

FIG. 4A illustrates an insert with sealed edges integrated into a seat and connected to a blower;

FIG. 4B illustrates an insert that has open edges integrated into a seat and connected to a blower;

FIG. 5C illustrates a trim layer and insert located within a seat and in fluid communication with a blower that is connected to the seat via a shield; and FIG. 5D illustrates a trim layer and insert located within a seat and in fluid communication with a blower that is connected to the seat via a foam connection.

DETAILED DESCRIPTION

Figure 1A:
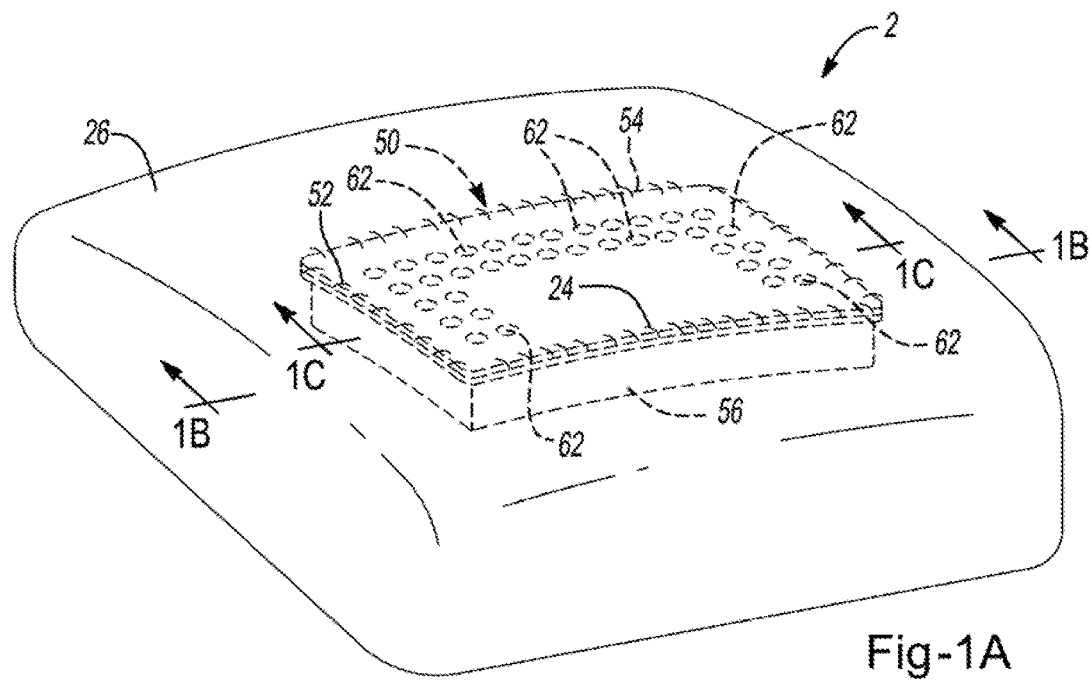
FIG. 1A is a perspective view of an insert connected to a trim layer.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated into a trim layer and the trim layer connects the insert to the vehicle seat.

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be part of a trim layer (e.g. cloth, leather, synthetic leather, or the like). Preferably, the insert of the conditioning system is connected to an becomes part of the trim layer. For example, during installation of the trim layer the insert is installed without a need for separate steps of installing the insert and the trim layer. The insert may be located proximate to a cushion or backrest (e.g. a foam support for the user). The insert may include all or a portion above the cushion, below the cushion, or both. Preferably, the insert is substantially entirely located above the cushion. The insert may be located within a recess in a cushion. A portion of the conditioning system (e.g., insert) may be located above the cushion and a portion of the conditioning system (e.g., blower, shield, connection insert, or a combination thereof) may be located below the cushion. The present conditioning system is particularly attractive for use in combination with a conditioned seat (e.g. a ventilated, actively cooled (such as by use of a thermoelectric device or module), or actively heated seat). The conditioning system may be integrated with the seat cover by way of sewing, gluing, other methods, a friction fit, being located between two static layers, or a combination thereof. The conditioning system may include one or more blowers and one or more inserts (i.e., ventilated trim bags); one or more heaters, one or more thermoelectric devices, or a combination thereof.

The conditioning system may include an active heating element (i.e., heater), an active cooling element, cooling through convection, or a combination thereof. The active heating element may be a resistive heating element. The heating element may be a PTC heater, a resistive wire, or both. The heating element may generate heat upon current flowing through the heating element. The heater may be located on a cover layer of the insert. Preferably, the heater is located under a cover layer of the insert. The heater may be located between a spacer layer and a cover layer. The heater may be an integral part of the insert. The heater may be connected to the cover layer, the insert, or both so that the heater may be free of movement relative to the cover layer, the insert, the trim layer, the cushion, or a combination thereof. The heater may be connected to the spacer, the cover layer or both by one or more connection materials. The heater may be located between two connection materials. The heater may be embedded in a connection material. The heater may be connected to a rear side of the cover layer by a connection layer that is sewing and a connection layer may extend over a rear side of the heater and a forward layer of the spacer layer. The heater may be a single resistive wire that is applied to the cover layer, the spacer layer or both in a pattern. The conditioning system may be free of a resistive heater. For example, a thermoelectric device may be used to produce heat. The conditioning system may include one or more air movers that assist in distributing heat, cooling, or both.

A conditioned seat may include one or more air movers (air movers and blowers are used interchangeably herein). The one or more blowers may move air through one or more inserts that are located within or overlay the backrest cushion, seat cushion, or both. The one or more inserts may distribute air from the blowers. The one or more blowers may be an axial fan, a radial fan, or both. Preferably, the one or more blowers are a radial fan. The one or more blowers may include a Thermoelectric Device (TED). The TED may heat air as it enters the blowers or as it leaves the blowers. The TED may cool air as the air enters the blowers or as the air leaves the blowers. The one or more blowers may include a heating device, a cooling device, or both (i.e. a thermoelectric device (TED)). The TED may be used to heat air and/or cool air that is blown onto the user. The blowers and TED may be placed in the seat or on the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g. trim layer), holes or perforations in a cushion, or a combination thereof. Some examples air permeable seats and heating device are U.S. Pat. Nos. 6,064,037 and 6,869,140 both of which are incorporated by reference herein for all purposes. The TED may produce heat and the blower may blow the hot air while the heater contemporaneously heats the seat; thereby, providing both conduction heating and convection heating. One or more blowers may move air across the TED so that conditioned air is moved into contact with an occupant.

The blower functions to push air, pull air, or both. The blower may be movable with the cushion, the insert, or both as an occupant sits on the cushion or leaves the cushion. The blower may be an axial fan. Preferably, the blower may be a radial fan. The blower may include one or more impellers that move air through the blower, the blower housing, the insert, or a combination thereof. The blower includes an inlet and an outlet. The inlet may be on the bottom side or the top side. Preferably, the inlet is in the bottom side of the blower. The blower may be connected to the cushion and free of direct connection with the insert. The blower may be connected via a shield, a connection insert, a foam connection, or a combination thereof. The blower may be located on a b-side of a vehicle seat, a cushion, or both. The inlet or the outlet of the blower may be connected to the insert via an attachment device.

The one or more attachment devices may function to connect a blower to the insert, cushion, or both. The one or more attachment devices may connect one or more blowers to a cushion, a frame of a seat, an insert, or a combination thereof. The blower may be suspended below the attachment device. The blower may be connected to the insert by a tail. The tail may extend from a side of the insert around a portion of the cushion so that the blower may be located distal from the insert. The one or more attachment devices may reside entirely below a cushion. The one or more attachment devices may reside entirely within a cushion. The one or more attachment devices may be located partially below a cushion and partially extend into a cushion. The one or more attachment devices may be located entirely within a through hole, channel, or both in the cushion. The one or more attachment devices may be rigid. The one or more attachment devices may be made of an air impermeable material. The one or more attachment devices may be pliable. The one or more attachment devices may elastically deform. The one or more attachment devices may move with the cushion, the insert, or both so that the insert is not felt by an occupant. The one or more attachment devices may mimic the stiffness of the cushion, the insert, or both so that the blower moves with the cushion, the insert, or both. The one or more attachment devices may be made of or include a polymer, plastic, a closed cell material, a plastic film, a polyester film, metal, or a combination thereof. The one or more attachment devices may be air impermeable. The one or more attachment devices may be flexible. The one or attachment devices may be a shield, a connection insert, a foam connection, or a combination thereof.

The one or more shields function to prevent air from moving out of a bottom side of a cushion. The one or more shields may cover one or more through holes within the cushion. The one or more shields may cover a rear surface of the cushion and prevent fluid from exiting the cushion via recesses, pores in the cushion, or both. The one or more shields may substantially seal a rear side of a cushion (i.e., the shield prevents air from being diverted from the air move to a location other than the through holes). The one or more shields may connect to the cushion and create a barrier on the rear side of the cushion. The one or more shields may connect a blower to the cushion. The one or more shields may divert air from the air mover to the one or more through holes within the cushion. The one or more shields may form a seal along edges so that the shield proximate to the cushion so that the one or more shields prevent fluid leakage. The one or more shields may be air impermeable. The one or more shields may be a rigid material. The one or more shields may include an elastomer or have some elastomeric characteristics. The one or more shields may be made of polyethylene (high or low density), polypropylene, polyvinyl chloride, polystyrene, nylon, thermoplastic polyurethanes, polyamide, or a combination thereof. The one or more shields may be used in lieu of or in addition to a connection insert, a foam connection, or both.

The one or more connection inserts function to connect a blower to the insert. The one or more connection inserts may extend from a back side (B-side) of the cushion to a top side (A-side) of the cushion or a portion of the distance therebetween. The one or more connection inserts may suspend the blower from the insert, the cushion, or both. The one or more connection inserts may be expandable and contractible. The one or more connection inserts may have an accordion shape. The one or more connection inserts may be elastomeric or include an elastomer. The one or more connection inserts may be air impermeable. The one or more connection inserts may be made of any of the materials discussed herein for the one or more shields. The one or more connection inserts may create a conduit. The one or more connection inserts may not support a blower and the blower may be supported by the cushion, the frame, or both. The one or more connection inserts may connect to a rear layer of the insert. The one or more connection inserts may form a fluid conduit through each of the one or more through holes in the cushion to a blower. The one or more connection inserts may connect to a shield, a foam connection, or both.

The one or more foam connections may function to provide air from the blower to the through holes within the cushion. The one or more foam connections may function to support the blower. The one or more foam connections may function to provide air to a through hole within a cushion and prevent the air from exiting from the through holes. The one or more foam connections may extend from an a-side to a b-side of a cushion or a distance therebetween. The one or more foam connections may be hollow. The one or more connection inserts may be compressible and inserted into the cushion and then expand to connect to the cushion. The one or more foam connections may be air impermeable. The one or more foam connections may have a trunk that connects to the blower. The trunk may be a main body portion that is in communication with the blower. The trunk may be located external of a cushion. The trunk may fluidly connect the blower to one or more branches. The one or more branches may extend fully or partially into the cushion. The one or more branches may be the same size as the trunk. The one or more branched may be smaller than the trunk. The one or more foam connections may have one or more or two or more branches that extend from the trunk to distribute air. The one or more foam connections may have a plurality of branches. The one or more branches may extend at least partially into a through hole within the cushion. The one or more branches may turn and extend at an angle relative to the trunk. For example, the trunk may extend parallel to a bottom of the seat and the branches may extend perpendicular to the trunk. One or more foam connections may be made of an open cell material and may be coated or wrapped with a material that prevents fluid from exiting the foam connections. The one or more foam connections may be a closed cell foam. The One or more foam connections may connect to the cushion, a frame, or both.

The cushion may function to support an occupant, a blower, or both. One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may be connected to or part of a conditioning system. The one or more cushions may be a foam material that provides cushioning to an occupant seated on the cushion. The one or more cushions may include one or more through holes that extend from a bottom of the cushion to a top of the cushion. The cushion may include one or more connection members that the insert, the trim layer, or both connect.

The one or more connection members function to retain the trim layer, the insert, or both on a cushion, in communication with an insert, or both. The one or more connection members may be connected to the cushion. The one or more connection members may be integrated into the cushion. The one or more connection members may be a rod, hook, or both that is integrated into the cushion when the cushion is formed. The one or more connection members may be a metal, plastic, a natural material, a synthetic material, a rope, a chord, or a combination thereof that is integrated into a foam cushion during manufacture of the cushion. The connection members may be sufficiently rigid so that the connection members prevent movement of the trim layer, the insert, or both relative to the cushion. The one or more connection members may be formed into the cushion adjacent to one or more through holes. The one or more through holes may function to allow fluid to extend from through the cushion. The one or more through holes may prevent fluid from leaking as fluid extends from the blower to the insert. The one or more through holes may connect to the blower, the insert, the attachment devices, or a combination thereof.

The one or more through holes may be round, oval, square, diamond, symmetrical, asymmetrical, or a combination thereof. The one or more through holes may extend between a b-side and an a-side or a recess of the cushion. The one or more through holes may extend to a top surface, a surface within a recess, or both. The one or more through holes may be sufficiently large so that an attachment member may extend into the through hole. The cushion may have one through hole that provides fluid to an insert. The cushion may have a plurality of through holes. The one or more through holes may form a channel through the cushion.

The channel may function to direct air between two locations. The channel may be an internal passageway within a through hole. The channel may house all or a portion of a blower, an attachment member, or both. The channels may terminate within a recess of the cushion. The one or more recesses function to receive an insert. The one or more recesses may prevent movement of the insert relative to the trim layer, the cushion, or both. The one or more recesses may be complementary in shape to the shape of the insert. The one or more recesses may be square, rectangular, symmetrical, asymmetrical, triangular, trapezoid, or a combination thereof. The one or more recesses may be substantially a same size and shape as the insert. The one or more recesses may prevent the insert from moving. The one or more recesses may form a wall of the insert. For example, an upper wall of the recess may from a rear layer of the insert so that fluid is directed into the spacer layer. The one or more recesses may be larger than the insert in one or more directions. For example, a length of the recess may be larger than the insert so that some air escapes from the insert or extends around the insert and is directed towards the occupant. The recess may be larger than the insert so that a gap is located between a wall of the insert and a wall of the recess. The insert may have one or more steps. The steps may receive a seam, a portion of the insert, or both. The one or more recesses may function to assist the trim layer in preventing movement of the insert.

The trim layer may function to support the insert, form a layer of the insert, or both. The trim layer may cover the cushion, the seat, or both. The trim layer may assist an insert in directing air to predetermined locations. The trim layer may be a fluid permeable material and may allow air to flow from the insert to an occupant. The trim layer may be made of or include an fluid impermeable material that includes holes or perforations that direct air to a predetermined location (e.g., leather, a polymer film layer on a cloth seat). The trim layer may be cloth, leather, a synthetic material, or a combination thereof. The trim layer may directly contact an occupant upon an occupant sitting within a vehicle seat. The trim layer may be connected to the insert via a connection material.

The connection material may function to integrate the trim layer and the insert. The connection material may connect the insert to a layer of the trim layer. The connection material may connect a plurality of layers together so that each individual layer is connected to the trim layer. The connection layer may extend along one or more layers. The connection layer may extend through one or more layers. The connection layer may chemically adhere one or more layers together, the insert to the trim layer, or both. The connection layer may mechanically connect one more layers together, the insert to the trim layer, or both. The connection layer may be a liquid adhesive, a dry adhesive, a one part adhesive, gluing, a two-part adhesive, an air permeable adhesive, an air impermeable adhesive, a peel and stick layer, or a combination thereof. The one or more connection layers may be heat staking, sewing, or both. The connection layer may connect the cover layer to a heater, a heater to a spacer layer, a cover layer to a spacer layer, a spacer layer to a rear layer, a spacer layer to a second spacer, layer, a cover layer to a trim layer, a spacer layer to a cushion, a spacer layer to a recess, or a combination thereof. The connection layer may extend between or through the rear layer and the cover layer. The connection layer may extend between or through the rear layer, the cover, layer, and the trim layer. For example, the rear layer, the cover, layer, and the trim layer may all be sewn together. The rear layer and the cover layer may be connected together before both layers are connected to the trim layer. For example, the rear layer and cover layer may be heat steaked together and then adhered to the trim layer. The connection layer may include both mechanical connectors and chemical connectors. For example, gluing or melting and sewing may be used. The connection layer may be applied in a pattern to any of the layers of the insert. The connection layer may be located along two opposing edges. The connection layer may extend around a peripheral edge region. The connection layer may have a window pattern (e.g., 4 squares in contact). The connection layer may be applied so that an "X" with no connection layer is formed within the connection material. The connection layer may be applied around the vent holes. The connection layer may be one or more strips, two or more strips, three or more strips, or four or more strips. The connection layer may be free of being located within a center or a central region of any of the layers of the insert. The connection layer pattern may extend around trenches, be free of a location proximate to a trench, or both. The insert may be directly connected to the trim layer without any intervening layers or material. The insert and trim layer may extend over one or more occupant sensors.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. The occupant sensor may be a sensor wire. The occupant sensor may be in contact with the insert. Preferably, the occupant sensor is located on a top of a cushion. The occupant sensor may be located between the trim layer and the insert. The occupant sensor may be connected to the trim layer or integrated into the trim layer and then insert connected below the occupant sensor. The occupant sensor may be connected to the insert and then both the insert and occupant sensor connected to the trim layer. The occupant sensor may have a mirror shape to the shape of the insert.

The insert may function to receive and distribute air. The insert may function to connect to the trim layer and distribute air to or from an occupant. The insert may function to maintain an open space when an occupant is located on the seat, on the insert, or both. The insert may include one or sealed edges (e.g., seams). The insert may include open edges. The insert may include one or more cover layers and one or more rear layers with one or more spacer layer layers extending between the one or more cover layers and the one or more rear layers. The insert may be one or more layers sandwiched together. The insert may be one or more layers contained between a cover layer and a rear layer. The cover layer may be directly connected to one or more spacer layers and the one or more spacer layers may be directly connected to a rear layer. Each of the layers may be connected together by one or more connection materials. The insert may be free of a rear layer, a cover layer, or both. The insert may include one or more holes in the one or more cover layers, one or more rear layers, or both. The insert may receive air from an air mover and distribute the air to predetermined locations. The insert may create an open space. The ventilated insert may resist crushing when an occupant sits in a vehicle seat. For example, the insert may not completely seal off and air may flow through an entire volume of the insert. The insert may include cutouts, internal slits, external slits, voids, apertures, carrier configuration, or the like may be shaped similarly or be aligned with the perforations in the seat cover. The insert may be one portion. The insert may be multiple insert portions.

The insert portions may function to prevent read through, prevent the insert from extending into a trench, distribute fluid to two or more regions, control air flow in desired regions, or a combination thereof. The insert portions may be fluidly connected. The insert may be fluidly separate. One attachment device may connect to each of the insert portions so that a single blower may move fluid through each of the insert portions. The insert portions may be mechanically connected. The insert portions may include a connection region that extends between a first insert portion and a second insert portion. The insert may include a plurality of connection regions. The insert may include a plurality of insert portions. The insert portions may be separated by one or more connection holes. One or more connection devices may extend between the insert portions and the insert portions so that an occupant in contact with the insert portions may not feel the connection devices. For example, a connection device (e.g., a hog ring) may connect to a connection region and the insert portions may maintain an occupant above the connection device so that an occupant does not feel the connection device, a trench, or both. The two or more insert portions may extend along one or more trenches. Each of the insert portions may extend along a trench so that a connection region extends over the trench. The insert portions may be mirror images of each other. The insert portions may each include an opening.

The opening may function to fluidly connect the air mover with the insert, the spacer material, or both. The opening may be in a rear layer of the insert. The opening may permit air to move from the spacer layer to the blower or from the blower to the spacer layer. The opening in the rear layer may be larger than the channel, the through hole, or both. The opening may be an absence of material in the rear layer. The rear layer may function to allow air to enter into the insert and to direct air towards exit locations. The rear layer may be permeable. Preferably, the rear layer may be impermeable, include an impermeable coating, or both. The rear layer may be a porous material. The rear layer may be a film. The rear layer may be made of a polymeric material. The rear layer may be made of polyester, biaxially oriented polyethylene terephthalate, polyvinyl fluoride, polyethylene, polypropylene, nylon, polyvinyl chloride, or a combination thereof. The rear layer and the top layer may be made of the same material. The rear layer may be one or more layers. Preferably, the rear layer is a single layer. The rear layer may connect to a shield, connection insert, foam connection, connection inserts, or a combination thereof. The rear layer may extend over the cushion to prevent fluid from exiting through the cushion. The rear layer may create a fluid barrier between the spacer layer and the cushion. The rear layer may direct fluid from the attachment devices into the insert. The rear layer may connect to the cover layer. The rear layer may be free of contact with the cover layer. The rear layer may extend parallel to the cover layer. The rear layer may be located between the spacer layer and the cushion. The rear layer may connect to a connector and the connector may be connected to the blower. The rear layer may be separated from a cover layer by a spacer layer.

The one or more spacer layers may function to create an open space between the cover layer and the rear layer. The one or more spacer layers may prevent the rear layer and the cover layer from being moved into contact. The one or more spacer layers may include one or more vent holes. The spacer layer may be a mesh material. The spacer layer may resist compression. The spacer layers may be resistant to filer. The spacer layers may be recyclable. The spacer layer may form a space for air to move through the insert. One example of a preferred material of the spacer layer is 3Mesh® spacer layer material manufactured by Muller Textile of Wiehl, Germany. The spacer layer may be one or more layers of material. The spacer layer may include two layers of spacer layer. When two or more spacer layers are present one or both of the spacer layers may include one or more vent holes. The vent holes may extend through a first spacer layer, a second spacer, layer, or both. The vent holes may extend from a rear surface to a forward surface so that the vent holes assist in directing fluid to a predetermined location. The vent holes may align with each other, vent holes in the cover layer, or both. A first spacer layer material may be stiffer than a second layer of spacer layer material. A first layer may extend under a second layer and the second layer may be softer than the first layer so that the second layer prevents an occupant from feeling components within the vehicle seat. A first spacer layer may be more pliable than a second spacer layer. The first spacer layer and the second spacer layer may have the same permeability. The spacer layer may have an air permeability of about 7000 $L/dm^2/min$; about 6000 $L/dm^2/min$; or about 5000 $L/dm^2/min$. The first spacer layer may have a permeability of about 5000 $L/dm^2/min$ or less and the second spacer layer may have a permeability of about 3000 $L/dm^2/min$ or less. The spacer layer may have a permeability of about 500 $L/dm^2/min$ or more, 1000 $L/dm^2/min$ or more, or about 1500 $L/dm^2/min$ or more. The second spacer layer may extend over the first spacer layer. The second spacer layer may be less rigid, have less read through, be more compliable, or a combination thereof. The second spacer layer may provide comfort to an occupant, prevent an occupant from feeling a first spacer layer, or both. The spacer layer may be a reticulated spacer, a soft spacer, or both. A permeability of a first spacer to a permeability of a second spacer may have a ratio of about 1:1 or more, about 1.2:1 or more, about 1.5:1 or more, about 1.75:1 or more, about 2:1 or more, or about 4:1 or less. The first spacer layer may be less permeable than then second spacer layer. The second spacer layer may be less permeable than the first spacer layer. The first spacer layer may have less open space than the second spacer layer. Voids or openings in the second spacer layer may be larger than voids or openings in the first spacer layer. A first spacer layer may have more voids or openings than the second spacer layer. The spacer layer may be an open cell foam. A second spacer layer may have smaller pores than a first spacer layer and the second spacer layer may have more pores than the second spacer layer. The spacer layer may have a compression stress. The compression stress of the spacer layer may be about 5 kPa or more, about 7 kPa or more, about 10 kPa or more. The compression stress of the spacer layer may be about 20 kPa or less or about 15 kPa or less. The compression stress of the spacer layer may vary by about ±2 or more, ±3 or more, or about ±4 or more. The compressibility of the first spacer layer may be about 2 kPa more than the second spacer layer. The compressibility of the first spacer layer may be about 3 kPa more than the second spacer layer. The compressibility of the first spacer layer may be about 4 kPa more than the second spacer layer. The first spacer layer may be thinner than the second spacer layer. The first spacer layer may be a same thickness as the second spacer layer. The first spacer layer may be thicker than the second spacer layer. The first spacer layer, the second spacer layer, or both may be a printed lattice structure. Preferably, the first spacer layer is a lattice structure that creates open space that air may pass through. Preferably, the spacer layer is a single layer of material that is located between the cover layer and the rear layer.

The cover layer may function to distribute air flow to or from predetermined locations. The cover layer may include one or more holes or vent holes. The cover layer may include a plurality of holes. The one or more holes may be aligned with holes in a cushion, holes in a trim layer, or both. The one or more holes may distribute air from the insert to locations that correspond with regions of an occupant (e.g., lower back or legs). The one or more holes may be an absence of material. The one or more holes may be formed by removing material. The one or more holes may be formed by cutting the cover layer. The cover layer and the rear layer may extend substantially parallel to each other without contacting each other. The insert may be free of a cover layer, a rear layer, or both. The spacer layer may be located between the cover layer and the rear layer but not connected to either the rear layer or the cover layer. The spacer layer may be connected to the rear layer, the cover layer, or both layers. The cover layer and the rear layer may be connected together around edges to form a seam. The cover layer and rear layer may be ultrasonically bonded together, melted together, glued together, heat staked, or a combination thereof. The cover layer may be air permeable. The cover layer may be permeable. The cover layer may be made of or include polyester, fleece, a woven material, a nonwoven material, an extruded material, a film, or a combination thereof. The cover layer and the rear layer may be connected together around edges, terminal locations, or both to form a seam (e.g., a peripheral edge). The cover layer may include one or more holes or vent holes.

The one or more vent holes may function to provide fluid to a location of interest or remove fluid from a location of interest. The one or more vent holes may be an absence of material. The one or more vent holes may be material that is cut, pressed, folded inward, or a combination thereof. For example, the vent holes may be formed by cutting the cover layer and folding the material inward. The one or more vent holes may be located in a pattern to equally distribute air, to apply air to desired locations, or both. The insert may include a plurality of vent holes. The vent holes may extend through a spacer layer, a first spacer layer, a second spacer layer, a cover layer, or a combination thereof. A seam may seal one or more edges of the insert to direct air to the vent holes.

The one or more seams may function to create sealed edges so that air can only leave the insert through predetermined locations. The one or more seams may extend along each edge of the insert so that a completely sealed bag is formed. The seams may extend about an external edge of the insert. The seams may extend around one or more connection holes along one or more connection regions, or both. The one or more seams may extend along only longitudinal edges or lateral edges. The one or more seams may prevent fluid from exiting the insert. The one or more seams may join the cover layer, the rear layer, the trim layer, or a combination thereof together. The seams may be formed by sewing, adhesive, heating, melting, a mechanical fastener, a chemical fastener, glue, peel and stick layer, hot melt adhesive, or a combination thereof. The seams may be free of any of the insert layer. The seams may extend beyond the insert layer so that the insert layer is entirely located between the top layer and the bottom layer. The seams may be located in a plane with the cover layer, the rear layer, or a location therebetween. Preferably, the one or more seams extend around a periphery of the insert so that all edges of the insert substantially prevent air leakage. The one or more seams, the insert, or both may include one or more connection holes. The one or more seams may extend along one or more edged of the connection region.

The one or more connection regions function to connect to or more regions of an insert portion, two or more parts of an insert, two insert portions, or a combination thereof. The one or more connection regions may be formed of a cover layer, a rear layer, a spacer layer, or a combination thereof. The one or more connection regions may be free of a spacer layer. The one or more connection regions may not transmit a fluid. The one or more connection regions may have a fluid channel. The one or more connection regions may be in contact with a connection device. The one or more connection regions may be pulled down towards the cushion by a connection device so that the insert is retained in place. The connection device may be formed by one or more cutouts in edges of the insert. The connection device may be two opposing cutouts in opposing edges of the insert. The connection device may be formed by two connection holes.

The one or more connection holes may function to align an insert with a cushion, to connect an insert to a cushion, or both. The one or more connection holes may form the connection region that connects the insert to the cushion, the connection member, or both. The one or more connection holes may extend through any portion of the insert. The one or more connection holes may extend through a seam, extra material, an ear along one or more edges of the insert, or a combination thereof. Preferably, the connection holes extend through a central portion of the insert. The one or more connection holes may only be used to align the trim bag with the cushion, holes in the cushion, a recess in the cushion, or a combination thereof. The one or more connection holes may receive a fastener, a portion of a connection device, or both. Two opposing connection holes may corm a connection region that may be used to connect the insert to the cushion. The connection holes may permit a connection device of the trim layer to extend through the insert into contact with a connection member of a cushion. The one or more connection holes may be free of connection and may be used for alignment by temporarily being contacted during attachment. The insert may be adhesively connected to the cushion. For example, a two faced tape, liquid adhesive, adhesive film, or a combination thereof may connect the insert to the cushion. The blower may assist in connecting the insert to the cushion via one or more attachment rings. The insert may include one or more attachment rings that allow air to be introduced into the insert without air escaping from the insert. The one or more connection holes may permit a connection device to extend through the insert and connect to the cushion, the seat frame, or both.

The one or more connection devices may function to connect the insert, the trim layer, or both to the cushion, the connection member, or both. The connection devices may be part of the insert. The connection device may be directly connected to the insert. The connection device may be indirectly connected to the trim layer. The connection device may be free of a direct connection with the trim layer. The one or more connection devices may be a ring, a hog ring, a fastener, a clip, or a combination thereof. The one or more connection devices may extend from the trim layer, the insert, or both into contact with a connection member of the cushion so that the insert, the trim layer, or both is pulled down, connected to the cushion, prevented from moving, or a combination thereof. The connection device may be plastic, metal, self-closing, closed by a tool, or a combination thereof.

FIG. 1A is a perspective view of a conditioning system 2 connected to a trim layer 26. The conditioning system includes an insert 50 having a peripheral seam 52. The peripheral seam 52 connects the cover layer 54 to the rear layer 56. The seam 52 in addition to connecting the cover layer 54 and the rear layer 56 acts as a connection material 24 that connects the insert 50 to the trim layer 26. The cover layer 54 includes a plurality of through holes 62 that assist in directing fluid to a location of interest.

Figure 1B:
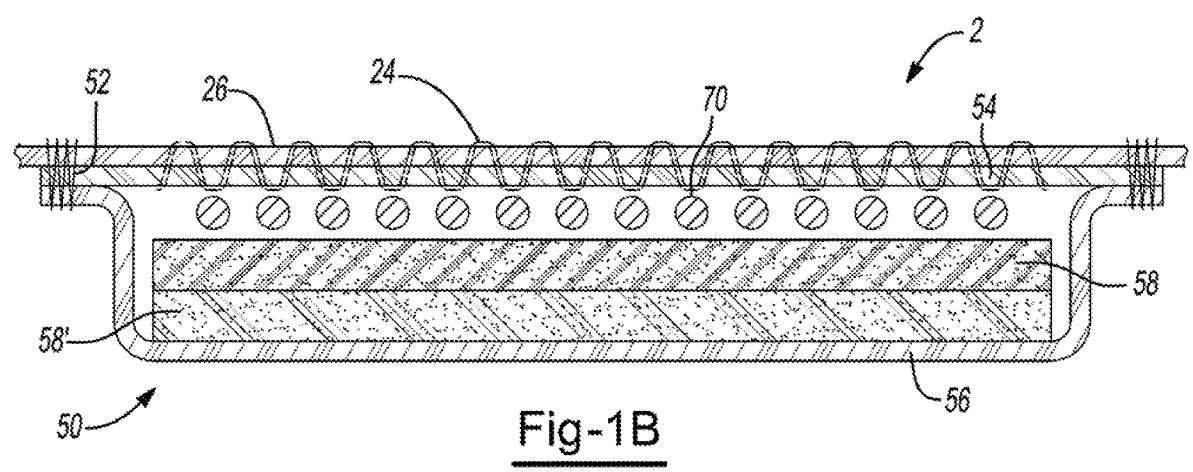
FIG. 1B is a cross-sectional view of the conditioning system of FIG. 1A along line 1B-1B with the conditioning system including an insert having multiple spacer layers integrated into a trim layer.

FIG. 1B is a cross-sectional view of a conditioning system 2 connected to a trim layer 26 and being cut along line 1B-1B in FIG. 1A. The conditioning system 2 includes an insert 50 that is directly attached to a trim layer 26 via a connection material 24 so that the insert 50 and the trim layer 26 form one unitary piece. The connection material 24 also connects the cover layer 54 and the rear layer 56 together to form the seam 52. The i seam 52/connection material 24 extend around a peripheral edge of the insert 50. The seam 52 encloses a heater 70 that extends over two spacer layers 58, 58'. The two spacer layers 58, 58' have different material characteristics. The connection material forming the seam 52, as shown, assists in connecting the insert 50 to the trim layer 26. The spacer layer 58 may be a comfort layer that is more compliant than the spacer layer 58'. The spacer layer 58 may be free of read through the trim layer 26 so that an occupant (not shown) cannot feel the heater 70, the spacer layer 58', or both.

Figure 1C:
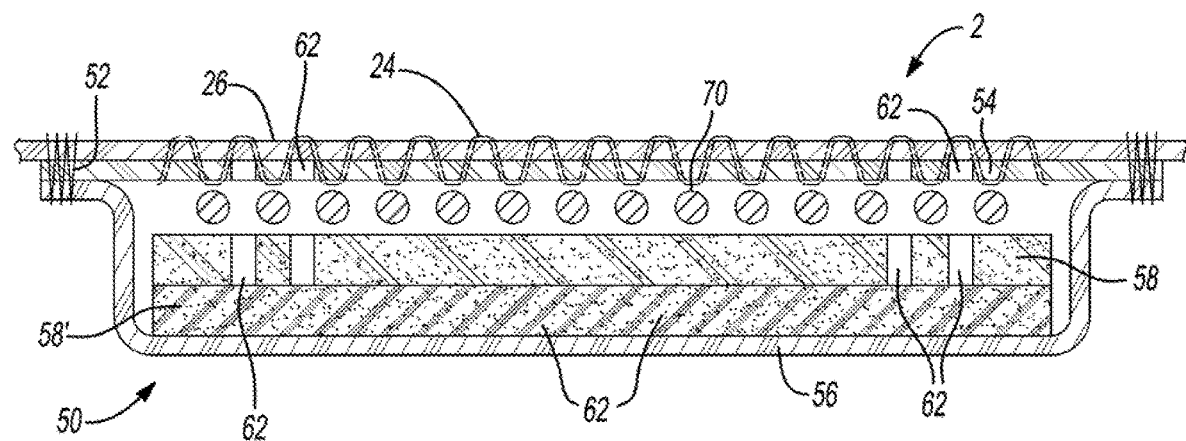
FIG. 1C is a cross-sectional view of the conditioning system of FIG. 1A along lines 1C-1C.

FIG. 1C is a cross-sectional view of a conditioning system 2 connected to a trim layer 26 and being cut along line 10-10 in FIG. 1A. The conditioning system 2 includes an insert 50 that is directly attached to a trim layer 26 via a connection material 24 so that the insert 50 and the trim layer 26 form one unitary piece. The connection material 24 also connects the cover layer 54 and the rear layer 56 together to form the seam 52. The seam 52/connection material 24 extend around a peripheral edge of the insert 50. The seam 52 encloses a heater 70 that extends over two spacer layers 58, 58'. The two spacer layers 58, 58' have different material characteristics. The spacer layer 58 and the cover layer 54 include through holes 62 and the spacer layer 58' is free of through holes. The connection material forming the seam 52, as shown, assists in connecting the insert 50 to the trim layer 26. The spacer layer 58 may be a comfort layer that is more compliant than the spacer layer 58', however, the spacer layer 58 is less permeable than then spacer layer 58' and includes through holes 62 to direct air therethrough. The spacer layer 58 may be free of read through the trim layer 26 so that an occupant (not shown) cannot feel the heater 70, the spacer layer 58', or both.

Figure 2:
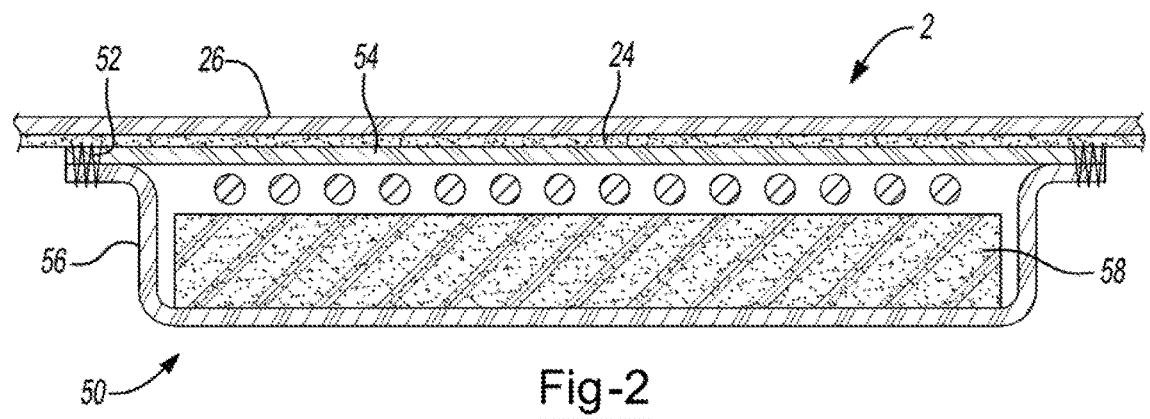
FIG. 2 illustrates a cross-sectional view of an insert including one spacer layer integrated into a trim layer.

FIG. 2 is a cross-sectional view of a conditioning system 2 with an insert 50 having a single spacer layer 58 located within the insert 50. The spacer layer 58 is retained within an insert 50 between a cover layer 54 and a rear layer 56 that are connected together by a seam 52. The spacer layer 58 is maintained in communication with the trim layer 26 by the connection material 24. A heater 70 is located within the insert 50 between the cover layer 54 and the spacer layer 58.

Figure 3:
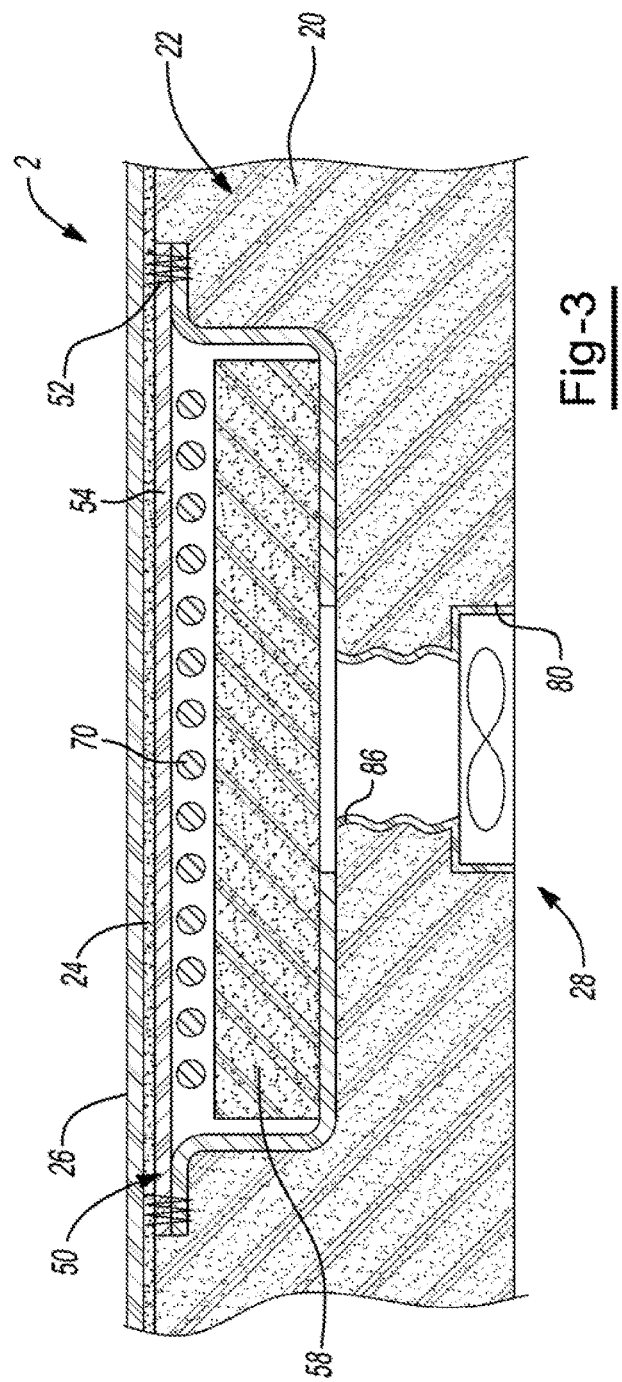
FIG. 3 illustrates a cross-sectional view of a trim layer an insert without a bottom layer integrated into a seat and connected to a blower.

FIG. 3 illustrates a cross-sectional view of a conditioning system 2. The conditioning system 2 is an insert 50 and blower 80 in fluid communication via a connection insert 86. The insert is directly attached to a trim layer 26 via a connection material 24 so that the insert 50 and the trim layer 26 form one unitary piece. The insert 50 includes a cover layer 54 and a rear layer 56 that are connected together forming a seam 52. The seam 52 encloses a heater 70 that extends over a spacer layer 58. The insert 50 is located within a recess 22 in the cushion 20 and connected to a connection insert 86 that extends through a through hole 28 to connect a blower 80 to the insert 50. The insert 50 is substantially a same size as the recess 22 in the cushion 20.

Figure 3A:
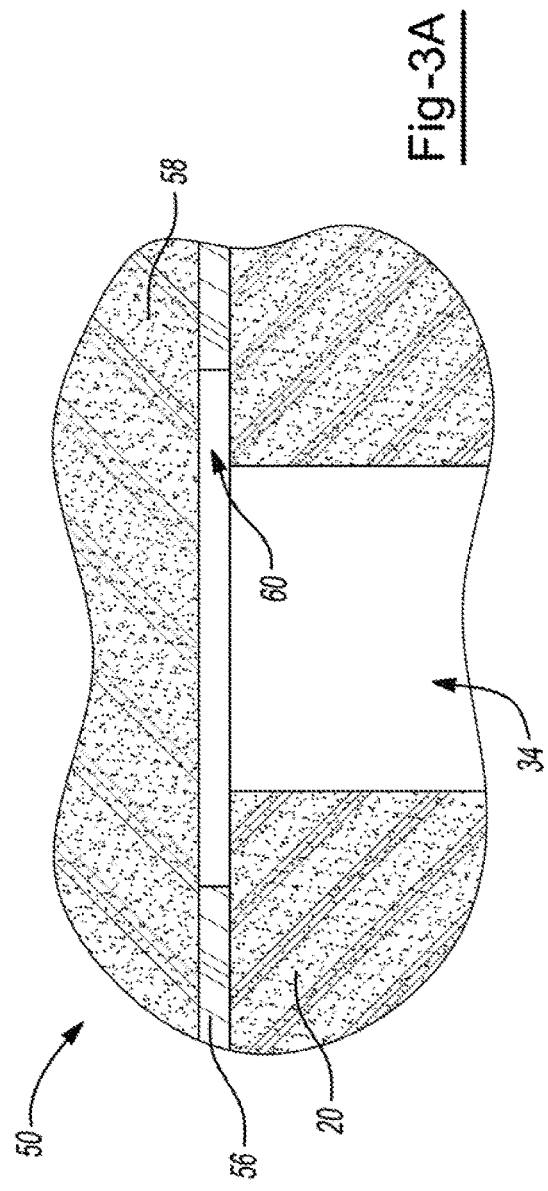
FIG. 3A is a close-up view of an inlet into the insert and the opening from the cushion.

FIG. 3A illustrates a close-up of an opening 60 in an insert 50 of FIG. 3. The insert 50 includes an opening 60 in the rear layer 56 that is larger than a channel 34 in the cushion 20 so that fluid freely enters the insert 50.

FIG. 4A illustrates a cross-sectional view of a conditioning system 2 integrated into a cushion 20. The cushion 20 includes a through hole 28 that receives a blower 80. The blower 80 is connected to the cushion 20 via a connection insert 86. The connection insert 86 provides air to the spacer 58 so that air moves through the spacer 58, cover layer 54, connection material 24, and through the trim layer 26 into communication with an occupant (not shown) at a surface of the trim layer 26. The insert 50 is free of a rear layer and the cover layer 54 forms a seal with the cushion 20 so that air is directed through the spacer layer 58 and holes in the trim layer 26. The connection material 24 connects the spacer layer 58 and heater 70 to the cover layer 54 and the cover layer 54 is connected to the trim layer 26 by the connection material 24 so that insert 50 is suspended from the trim layer 26. When an occupant (not shown) is in contact with the trim layer 26, the spacer layer 58 is compressed over the connection insert 86 so that air is prevented from moving between the spacer layer 58 and the cushion 20. The connection insert 86 mimics the stiffness of the foam so that the blower 80 is movable with the cushion 20 as the cushion 20 moves with an occupant.

FIG. 4B illustrates a cross-sectional view of a conditioning system 2. The conditioning system 2 is an insert 50 that is directly attached to a trim layer 26 via a connection material 24 so that the insert 50 and the trim layer 26 form one unitary piece. The insert 50 includes a cover layer 54 and a rear layer 56 that extend along opposing surfaces of the spacer 58 but are free of contact with each other. The insert 50 is free of a seam that encloses a heater 70 and spacer layer 58 within the cover layer 54 and the rear layer 56. Each of the layers of the insert 50 are connected together via the connection material 24. The connection layer 24 is located between and connects the trim layer 26 to the cover layer 54, the cover layer 54 to the spacer layer 58, and the spacer layer 58 to the rear layer 56. The connection layer 24 assists in retaining the heater 70 between the spacer layer 58 and the cover layer 54. The insert 50 is located with a recess in the cushion 20 and connected to a connection insert 86 that extends through a through hole 28 to fluidly connect a blower 80 to the insert 50. A gap (G) is located between a side wall of the insert 50 and a side wall of the cushion 20 recess 22 so that some fluid may pass between the insert 50 and the cushion 20.

Figure 4D:
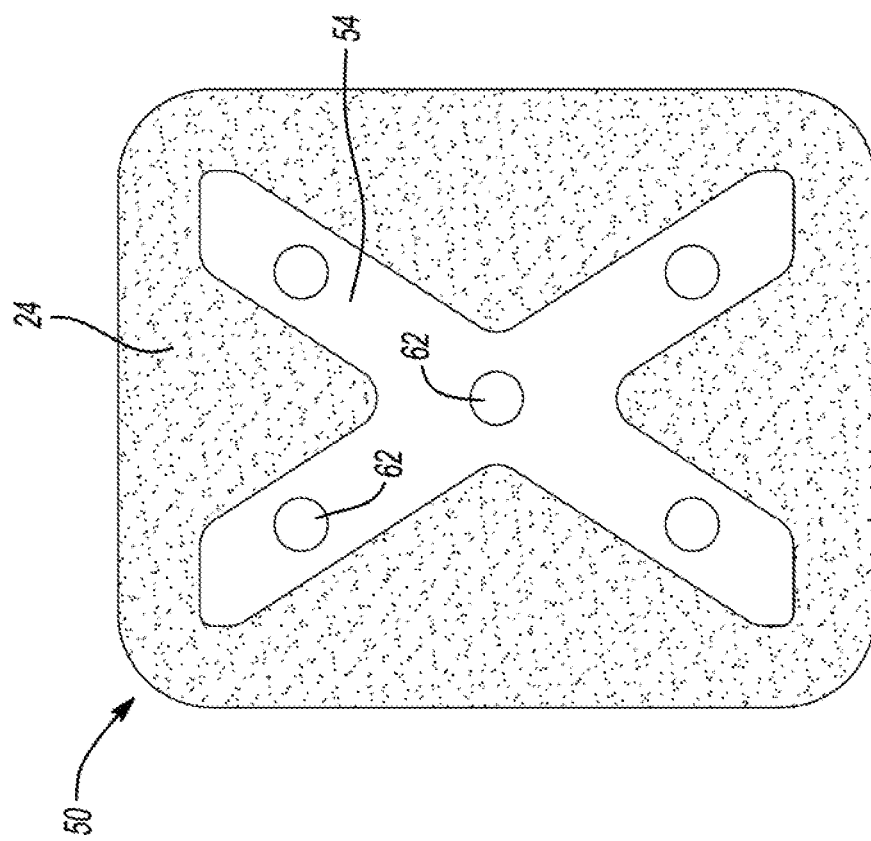
FIG. 4D illustrates a top view of a cover layer including connection material.
Figure 4C:
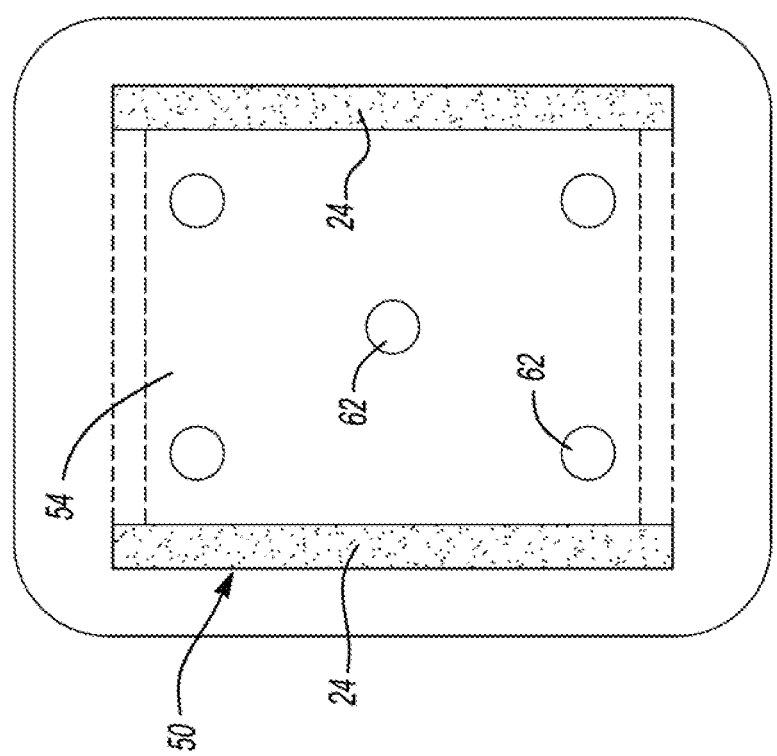
FIG. 4C illustrates a top view of a cover layer including connection material.

FIG. 4C is a top view of an insert 50. The insert 50 includes a cover layer 54 including a plurality of vent hole 62. The cover layer 54 is connected to a trim layer (not shown) by connection material 24 that extends along opposing edge regions.

FIG. 4D is a top view of an insert 50. The insert 50 includes a cover layer 54 including a plurality of vent holes 62. The cover layer 54 is connected to a trim layer (not shown by connection material 24. The connection material 54 covers regions of the cover layer 54 where air flow is not desired so that more air flow extends to desired regions such as the vent holes 62. As shown, the connection material 54 covers the cover layer 54 so that an "X" shape is formed where no connection material 54 is present.

Figure 5A:
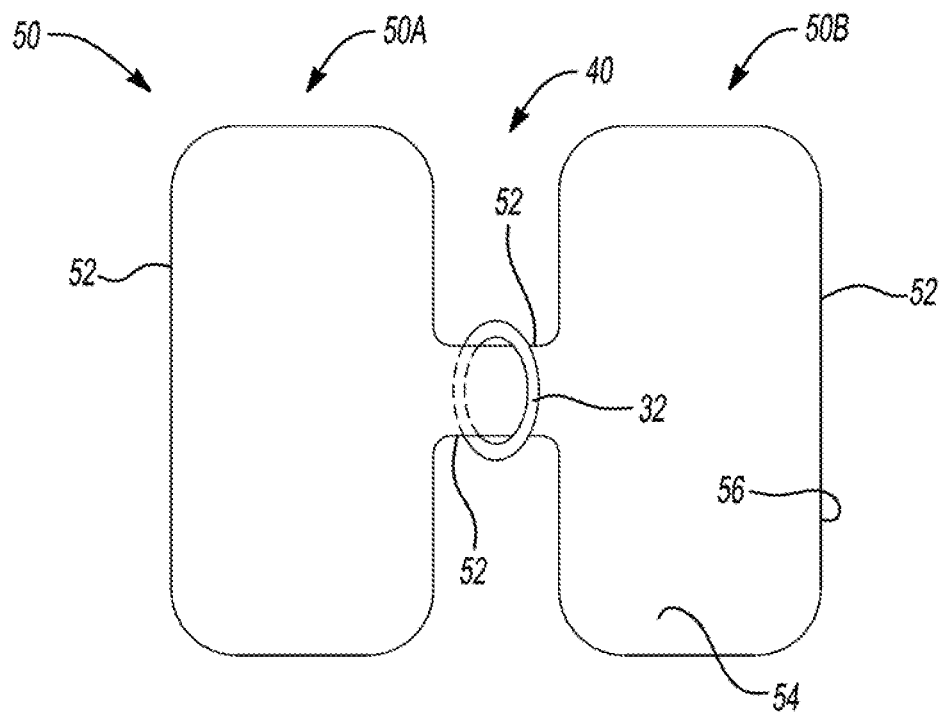
FIG. 5A illustrates a top view of an insert having a connection region that receives a connection device.

FIG. 5A illustrates a top view of an insert 50 having a first insert portion 50A and a second insert portion 50B. The first insert portion 50A and the second insert portion 50B are connected together by a connection region 40. The connection region 40 receives a connection device 32 to assist in connecting the insert to a seat (not shown). The insert 50 includes a cover layer 54 and a rear layer 56 that are connected together via a seam 52 that extends along all of the external edges of the insert 50.

Figure 5B:
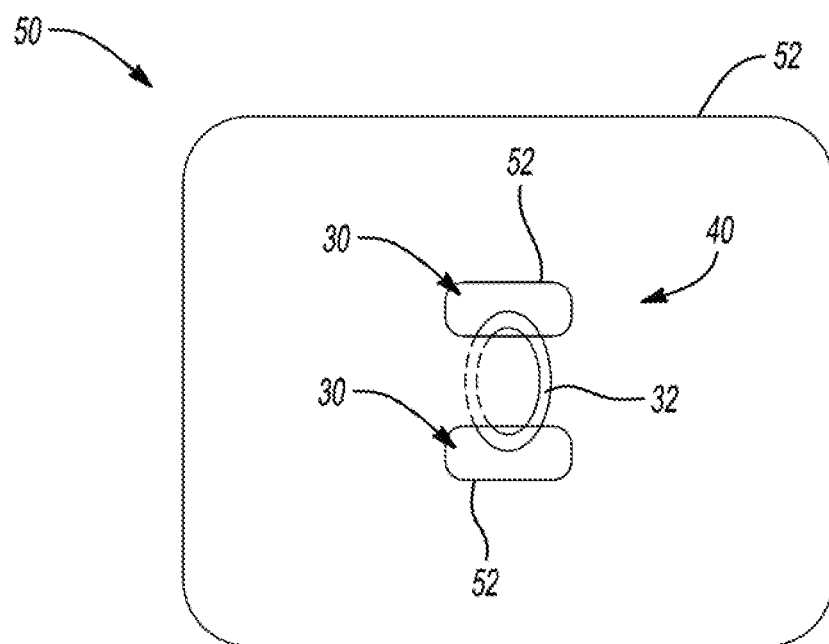
FIG. 5B illustrates a top view of an insert having a connection region with a plurality of connection holes that receive a connection device.

FIG. 5B is a top view of an insert 50 having a connection region 40. The connection region 40 is formed between two opposing connection holes 30. A connection device 32 extends around the connection region 40 and assists in connecting the insert 50 to a seat (not shown). A seam 52 extends around an external periphery of the insert 50 and around each of the connection holes 30.

FIG. 5C illustrates a conditioning system 2 with an insert 50 that includes a connection hole 30. A connection device 32 extends through the connection hole 30 and connects the insert 50 to connection member 36 in a cushion 20. The connection hole 30 divides the insert into two insert portions 50A and 50B. A blower 80 is connected to the cushion 20 by a shield 84 that creates a pocket under the cushion 20 and covers the through holes 28. The shield 84 connects the blower 80 to the cushion 20 and prevents air from exiting at a location other than through the insert 50. The shield 84 directs air into the channels 34 in the cushion 20 that are in fluid communication with the insert 50. The insert 50 is connected to the trim layer 26 via a connection material 24 (e.g., sewing or adhesive). The trim layer 26 may include a plurality of holes that allow air to pass out through the insert 50 and the trim layer 26. The insert 50 includes a cover layer 54 and a rear layer 56 that are connected together via seams 52. The insert 50 includes a heater 70 and a spacer 58.

FIG. 5D illustrates a cross-sectional view of part of a conditioning system 2 including a cushion 20 with a pair of through holes 28 forming channels 34 in the cushion 20. A foam connection 88 connects a blower 80 to the through holes 28 within the cushion 20. The foam connection 88 directs air into each of the through holes 28 so that the air is distributed to an occupant.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conditioning System
20 Cushion
22 recess
24 Connection material (sewn/adhesive)
26 Trim layer
28 Through hole
30 Connection holes
32 Connection device
50 Insert
52 Seam
54 Cover layer—most likely a fleece
56 Rear layer
58 Spacer layer
70 Heater—on underside of fleece—
80 Blower
84 Shield/plenum
86 Connection insert/compressible duct bellows
88 Foam connection/plenum
90 Trunk
92 branch

We claim:

1. An insert for a climate controlled vehicle seat, the insert comprising:

a cover layer;
a heater arranged below the cover layer;
a connection layer arranged below the heater; and
a spacer layer located below the connection layer;
wherein the vehicle seat comprises a cushion having a recess defined in a top side thereof, and at least a portion of the insert is configured to be received into the recess and then covered by a trim layer of the vehicle seat, and
wherein when the insert is viewed in cross section, a width of the recess is greater than a width of the spacer layer so that a gap is defined between a side wall of the spacer layer and a side wall of the recess.

2. The insert according to claim 1, wherein the spacer layer comprises one or more vent holes.

3. The insert according to claim 2, wherein the connection layer is applied around the one or more vent holes in the spacer layer.

4. The insert according to claim 3, wherein the heater is attached directly to a top surface of the connection layer and the spacer layer is attached directly to a bottom surface of the connection layer.

5. The insert according to claim 4, wherein the heater is attached directly to a bottom side of the cover layer, and an opposing top side of the cover layer is attached directly to the trim layer of the vehicle seat.

6. The insert according to claim 5, wherein the spacer layer is attached directly to the cushion and/or wherein the insert is free of any layers between the spacer layer and the cushion.

7. The insert according to claim 3, wherein the connection layer comprises tape.

8. The insert according to claim 7, wherein the tape is air permeable and/or wherein the connection material comprises one or more strips.

9. The insert according to claim 1, wherein the spacer layer comprises reticulated foam.

10. The insert according to claim 9, wherein the heater is attached directly to a top surface of the connection layer and the spacer layer is attached directly to a bottom surface of the connection layer and/or the spacer layer is attached directly to the cushion without any layers between the spacer layer and the cushion.

11. The insert according to claim 1, wherein when the insert is viewed in the cross section, the cover layer has a width that is wider than a width of the spacer layer.

12. The insert according to claim 11, wherein a top surface of the cover layer is generally aligned with a top surface of the cushion after the insert is received into the recess.

13. The insert according to claim 11, wherein the cushion comprises a second recess surrounding the recess, the cover layer is supported in the second recess and the spacer layer is received into the recess.

14. The insert according to claim 13, wherein the second recess has a ledge upon which the cover layer is supported, the ledge is generally parallel to a bottom surface of the recess upon which the spacer layer is supported.

15. The insert according to claim 1, wherein the insert is connected to a blower via a connection insert, that extends at least partially through a thickness of the cushion and when an occupant is in contact with the trim layer, the spacer layer is compressed over the connection insert so air is prevented from moving between the spacer layer and the cushion.

16. The insert according to claim 15, wherein the cushion comprises a through hole into which the blower is received.

17. An insert for a climate controlled vehicle seat, the insert comprising:
a cover layer;
a heater arranged below the cover layer;
a connection layer arranged below the heater; and
a spacer layer located below the connection layer;
wherein the vehicle seat comprises a cushion having a recess defined in a top side thereof, and at least a portion of the insert is configured to be received into the recess and then covered by a trim layer of the vehicle seat, the cushion comprises a through hole into which a blower is received, and
wherein the insert is connected to the blower via a connection insert, that extends at least partially through a thickness of the cushion and when an occupant is in contact with the trim layer, the spacer layer is compressed over the connection insert so air is prevented from moving between the spacer layer and the cushion.

18. The insert according to claim 17, wherein the heater is attached to a top surface of the connection layer and/or the spacer layer is attached to a bottom surface of the connection layer.

19. The insert according to claim 17, wherein the heater is attached to a bottom side of the cover layer, and an opposing top side of the cover layer is attached to the trim layer of the vehicle seat.

20. The insert according to claim 17, wherein the cushion comprises a second recess surrounding the recess, the cover layer is supported in the second recess and the spacer layer is received into the recess, and the second recess has a ledge upon which the cover layer is supported.

* * * * *